(12) United States Patent
Huang et al.

(10) Patent No.: US 8,081,401 B1
(45) Date of Patent: Dec. 20, 2011

(54) DISK DRIVE INCLUDING AN ACTUATOR LATCH WITH A CANTILEVERED STOP PORTION

(75) Inventors: Lidu Huang, Danville, CA (US); Joshua P. Weiher, San Jose, CA (US); Zakir A. Quabili, Milpitas, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 953 days.

(21) Appl. No.: 11/960,474

(22) Filed: Dec. 19, 2007

Related U.S. Application Data (63) Continuation-in-part of application No. 11/345,141, filed on Feb. 1, 2006, now Pat. No. 7,715,149.

(51) Int. Cl.
*G11B 5/54* (2006.01)
*G11B 21/22* (2006.01)

(52) U.S. Cl. .................. 360/256.2; 360/256.4
(58) Field of Classification Search .......... 360/256–256.6
See application file for complete search history.

(56) References Cited

U.S. PATENT DOCUMENTS

| | | | | |
|---|---|---|---|---|
| 4,692,829 | A | * | 9/1987 | Campbell .................. 360/256.1 |
| 4,796,130 | A | * | 1/1989 | Shimanuki .................. 360/256.3 |
| 4,881,139 | A | | 11/1989 | Hazebrouck |
| 5,363,261 | A | | 11/1994 | Eckberg et al. |
| 5,365,389 | A | | 11/1994 | Jabbari et al. |
| 5,369,538 | A | | 11/1994 | Moe et al. |
| 5,404,257 | A | | 4/1995 | Alt |
| 5,455,726 | A | | 10/1995 | Liu |
| 5,483,399 | A | | 1/1996 | Jeong et al. |
| 5,543,986 | A | | 8/1996 | Albrecht |
| 5,600,516 | A | | 2/1997 | Phillips et al. |
| 5,659,449 | A | | 8/1997 | Brooks, Jr. et al. |
| 5,668,683 | A | | 9/1997 | Stone |
| 5,734,527 | A | | 3/1998 | Reinhart |
| 5,768,058 | A | | 6/1998 | Hofland |
| 5,793,572 | A | | 8/1998 | Lalouette et al. |
| 5,870,256 | A | | 2/1999 | Khanna et al. |
| 6,028,746 | A | | 2/2000 | Matsumura |
| 6,118,636 | A | | 9/2000 | Hatch et al. |
| 6,134,077 | A | | 10/2000 | Misso et al. |
| 6,163,440 | A | | 12/2000 | Takahashi et al. |
| 6,185,074 | B1 | | 2/2001 | Wang et al. |
| 6,215,628 | B1 | | 4/2001 | Boutaghou |
| 6,252,745 | B1 | | 6/2001 | McReynolds et al. |
| 6,327,119 | B1 | | 12/2001 | Barina et al. |
| 6,339,521 | B1 | | 1/2002 | Durrum et al. |

(Continued)

OTHER PUBLICATIONS

Office Action dated Jan. 16, 2009 from U.S. Appl. No. 11/345,141, 26 pages.

(Continued)

*Primary Examiner* — Daniell L Negron
*Assistant Examiner* — Adam B Dravininkas (57) ABSTRACT

A novel actuator latch includes a catch portion interfering with actuator rotation with the latch in a closed position. The latch includes a first stop portion that is in contact with a fixed member with the latch in the closed position. The latch includes a pusher portion that is in contact with the actuator with the latch in the closed position and with the actuator in an extreme rotational position. The latch includes a second stop portion comprising a cantilevered finger having a supported end and a free distal end. The free distal end is in contact with the second fixed member with the latch in the open position. Neither the catch portion nor the pusher portion is disposed on the cantilevered finger.

13 Claims, 10 Drawing Sheets

U.S. PATENT DOCUMENTS

| | | |
|---|---|---|
| 6,381,102 B1 | 4/2002 | Strom et al. |
| 6,400,533 B1 | 6/2002 | Liu et al. |
| 6,501,624 B1 | 12/2002 | Gillis et al. |
| 6,507,461 B1 | 1/2003 | Kimura et al. |
| 6,529,349 B1 | 3/2003 | Byun et al. |
| 6,535,357 B1 | 3/2003 | Misso et al. |
| 6,535,358 B1 | 3/2003 | Hauert et al. |
| 6,535,359 B1 | 3/2003 | Boutaghou |
| 6,574,073 B1 | 6/2003 | Hauert et al. |
| 6,600,515 B2 | 7/2003 | Bowyer et al. |
| 6,624,980 B1 | 9/2003 | Watson et al. |
| 6,650,507 B2 | 11/2003 | Nelson et al. |
| 6,710,980 B1 | 3/2004 | Hauert et al. |
| 6,731,468 B2 | 5/2004 | Williams et al. |
| 6,744,604 B2 | 6/2004 | Misso |
| 7,061,723 B2 | 6/2006 | Price |
| 7,564,654 B2 | 7/2009 | Kim et al. |
| 7,610,672 B1 | 11/2009 | Liebman |
| 7,684,155 B1 | 3/2010 | Huang et al. |
| 7,715,149 B1 * | 5/2010 | Liebman et al. ........... 360/256.2 |
| 7,957,102 B1 | 6/2011 | Watson et al. |
| 2002/0044386 A1 * | 4/2002 | Koyanagi et al. .......... 360/254.8 |
| 2002/0135944 A1 * | 9/2002 | Misso .......................... 360/256 |
| 2003/0035246 A1 | 2/2003 | Byun et al. |
| 2004/0027726 A1 | 2/2004 | Hong et al. |
| 2004/0141256 A1 | 7/2004 | Hong et al. |
| 2004/0145831 A1 * | 7/2004 | Kanada et al. ............. 360/256.4 |
| 2004/0145832 A1 | 7/2004 | Kanada et al. |
| 2004/0257709 A1 * | 12/2004 | Lee et al. ...................... 360/256 |
| 2005/0264941 A1 | 12/2005 | Tsuda et al. |
| 2007/0146937 A1 * | 6/2007 | Akama et al. .............. 360/256.4 |

OTHER PUBLICATIONS

Notice of Allowance dated Jan. 13, 2010 from U.S. Appl. No. 11/345,141, 6 pages.

Office Action dated Jul. 8, 2009 from U.S. Appl. No. 11/345,141, 18 pages.

Notice of Allowance dated Feb. 17, 2011 from U.S. Appl. No. 11/866,772, 31 pages.

* cited by examiner

*FIG. 12* of the actuator. Such a sudden relative rotation of the actuator may result in damage to the HSA, especially to its attached head gimbal assemblies. The adjacent disk surface (s) may also be damaged, which may result in loss of data. Various latch designs have attempted to secure the actuator during such mechanical shock events, but many such designs have proven to be complex, costly or unreliable. Accordingly, there is need in the art for an improved actuator latch configuration.

DISK DRIVE INCLUDING AN ACTUATOR LATCH WITH A CANTILEVERED STOP PORTION

FIELD OF THE INVENTION

The present invention relates generally to disk drives, and in particular to an actuator latch that also serves as an actuator crash stop used in a disk drive.

BACKGROUND

The typical hard disk drive includes a head disk assembly (HDA) and a printed circuit board assembly (PCBA) attached to a disk drive base of the HDA. The HDA includes at least one disk (such as a magnetic disk, magneto-optical disk, or optical disk), a spindle motor for rotating the disk, and a head stack assembly (HSA). The spindle motor typically includes a rotatable spindle motor hub on which the disks are mounted and a stator. Rotation of the spindle motor hub results in rotation of the attached disks.

The HSA includes an actuator, at least one head gimbal assembly (HGA), and a flex cable assembly. A conventional "rotary" or "swing-type" actuator typically includes an actuator body. The actuator body has a pivot bearing cartridge to facilitate rotational movement of the actuator. One or more actuator arms extend from the actuator body. Each actuator arm typically supports one or two HGAs. An actuator coil is supported by the actuator body opposite the actuator arms. The actuator coil is configured to interact with one or more magnets, typically a pair, to form a voice coil motor (VCM). The PCBA controls current passing through the actuator coil that results in a torque being applied to the actuator. The flex cable assembly electrically couples the HSA to the PCBA, and carries the current to the actuator coil.

Each HGA includes a head for reading and writing data from and to the disk. In an optical disk drive, the head will typically include a mirror and objective lens for reflecting and focusing a laser beam on to a surface of the disk. In magnetic recording applications, the head will typically include a transducer having a writer that may be of a longitudinal or perpendicular design, and a read element that may be inductive or magnetoresistive. The flex cable assembly also carries the signals from/to the PCBA to/from the heads as the heads write and read information recorded in concentric circular tracks on the disks.

A latching mechanism is provided to facilitate latching of the actuator in a parked position when the heads are not being used to read from or write to the tracks of information on the disk. In the parked position, the actuator is positioned with the heads either at an inner diameter (ID) of the disk or at or beyond an outer diameter (OD) of the disk such as upon a ramp. A crash stop coupled to the disk drive base is provided to limit rotation of the actuator in a given direction. The crash stop is configured to contact a portion of the actuator when the actuator is rotated to an extreme rotational position in a given rotational direction. Another crash stop may be provided to limit actuator rotation in an opposite rotational direction. The latching mechanism may additionally function as one of the crash stops.

Disk drives are frequently used in small mobile electronic devices such as laptop and hand-held computing devices, audio devices, audio/video devices, and personal electronic organizers. In such applications there is an enhanced risk that the disk drive may be subject to mechanical shock events, for example when the host device is dropped. During a mechanical shock event, the disk drive base may experience significant rotational accelerations that can cause a sudden relative rotation of the actuator. Such a sudden relative rotation of the actuator may result in damage to the HSA, especially to its attached head gimbal assemblies. The adjacent disk surface (s) may also be damaged, which may result in loss of data. Various latch designs have attempted to secure the actuator during such mechanical shock events, but many such designs have proven to be complex, costly or unreliable. Accordingly, there is need in the art for an improved actuator latch configuration.

SUMMARY

A novel disk drive is disclosed and claimed. The disk drive has first and second fixed members in fixed spatial relation to the disk drive base. An actuator is rotatably coupled to the disk drive base about an actuator pivot location. A latch is rotatably coupled to the disk drive base about a latch pivot location. The latch includes a catch portion interfering with actuator rotation with the latch in a closed position. The catch portion does not interfere with actuator rotation with the latch in an open position. The latch includes a pusher portion that is in contact with the actuator with the latch in the closed position and with the actuator in an extreme rotational position. The latch includes a first stop portion that is in contact with the fixed member with the latch in the closed position. The first stop portion is not in contact with the fixed member with the latch in the open position. The latch includes a second stop portion comprising a cantilevered finger having a supported end and a free distal end. The supported end is attached to the latch. The free distal end is in contact with the second fixed member with the latch in the open position. The second stop portion is not in contact with the second fixed member with the latch in the closed position. Neither the catch portion nor the pusher portion is disposed on the cantilevered finger.

DESCRIPTION OF THE PREFERRED EMBODIMENTS

Figure 1:
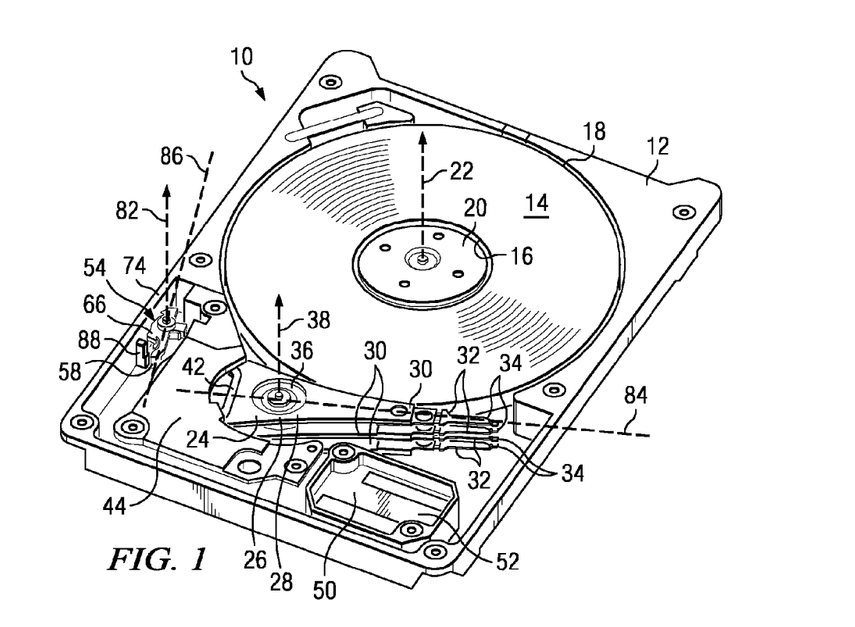
FIG. 1 is a top perspective view of a disk drive (without any cover shown) including a latch (in a closed position) and an actuator (in a parked position) according to an embodiment of the present invention.
Figure 2:
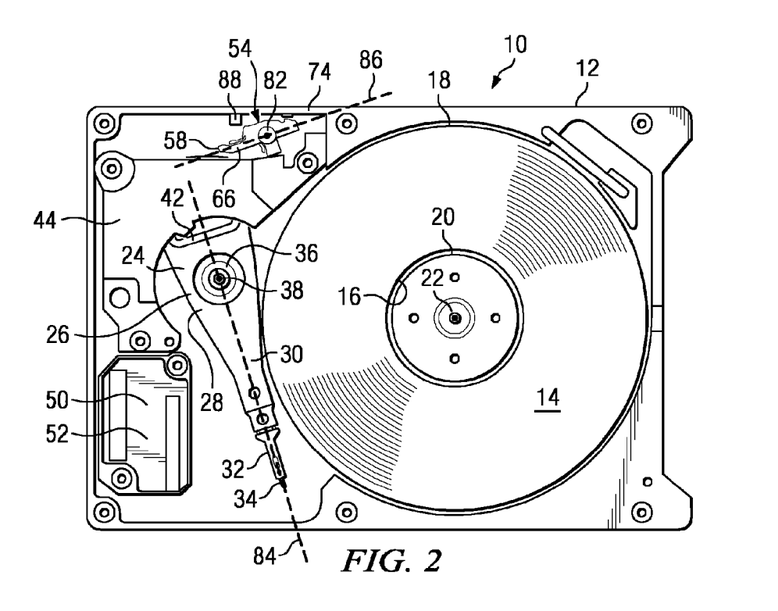
FIG. 2 is a top plan view of the disk drive of FIG. 1.

FIGS. 1 and 2 depict a top perspective view and a top plan view of a disk drive 10 according to an embodiment of the present invention, respectively. The disk drive 10 includes a head disk assembly (HDA) and a printed circuit board assembly (PCBA) (not shown). The head disk assembly includes a disk drive base 12 and a cover (not shown for ease of illustration of the internal disk drive components). The disk drive base 12 and the cover collectively comprise a housing that encloses disks 14 and several other components. A single disk or multiple disks may be utilized. Each disk 14 defines an inner diameter (ID) 16 and an outer diameter (OD) 18. Each disk 14 further includes a media surface on which a plurality of data tracks may be written and/or read by magnetic or optical means. The head disk assembly further includes a spindle motor 20 for rotating the disks 14 about a disk rotation axis 22. The head disk assembly further includes a head stack assembly 24 rotatably attached to the disk drive base 12. The head stack assembly 24 includes an actuator 26.

The actuator 26 includes an actuator body 28 and actuator arms 30 that extend from the actuator body 28. For angular reference purposes, each actuator arm 30 may define an actuator arm longitudinal axis 84. Distally attached to the actuator arms 30 are suspension assemblies 32. The suspension assemblies 32 support heads 34, respectively. The suspension assemblies 32 with the heads 34 are referred to as head gimbal assemblies. It is contemplated that the number of actuator arms and suspension assemblies may vary depending upon the number of disks and disk surfaces utilized.

Each head 34 includes a transducer for at least reading data from a disk surface. The transducer may include both a read element and a writer. In magnetic recording applications, the transducer's writer may be of a longitudinal or perpendicular design, and the read element of the transducer may be inductive or magnetoresistive. In optical and magneto-optical recording applications, the head may also include an objective lens and an active or passive mechanism for controlling the separation of the objective lens from a disk surface of the disk 14. The disk 14 includes opposing disk surfaces which may include one or more magnetic layers. Data may be recorded along data tracks on a single disk surface or both disk surfaces.

The HSA 24 may be pivoted such that each head 34 is disposed adjacent to various data tracks on a disk surface (e.g., from adjacent to the outer diameter 18 to adjacent to the inner diameter 16 of the disk 14). In the embodiment shown, the actuator body 28 includes a bore, and the actuator 26 further includes a pivot bearing cartridge 36 engaged within the bore for facilitating the actuator body 28 to rotate within a limited angular range about an axis of rotation 38.

Figure 3:
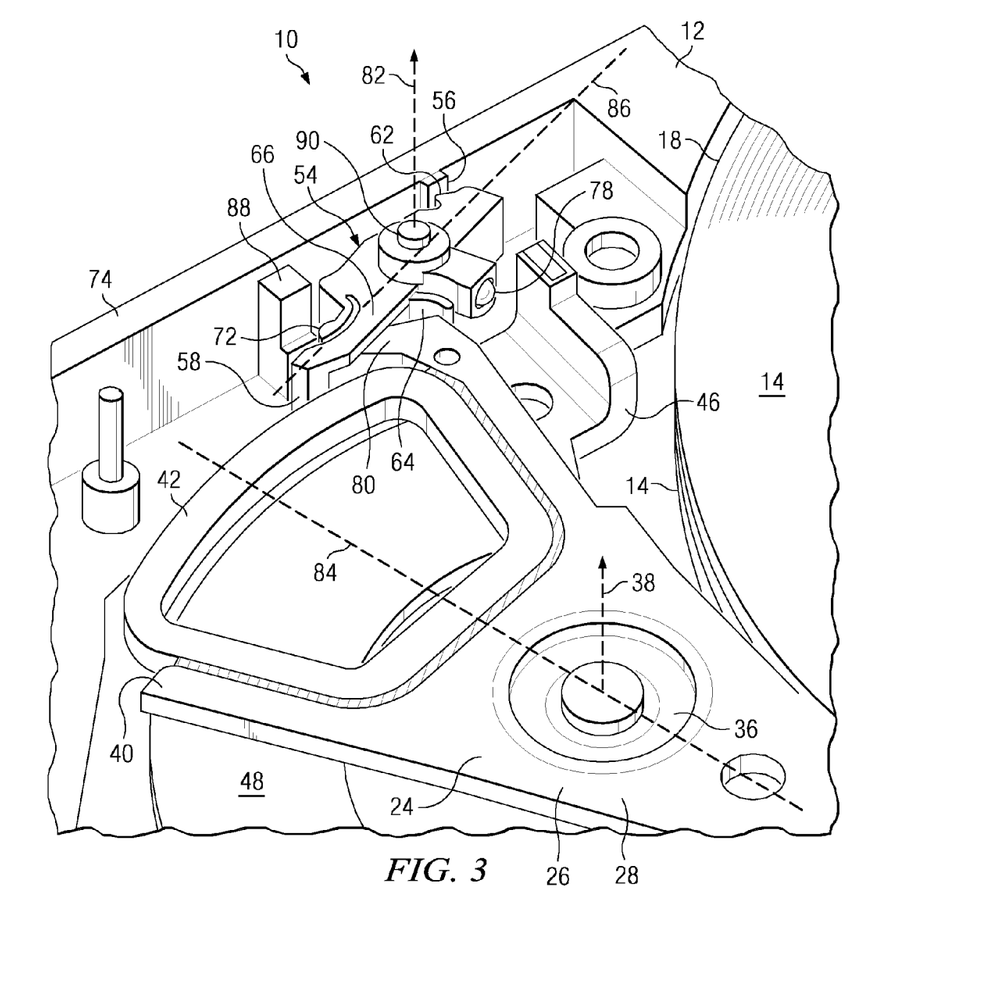
FIG. 3 is an enlarged top perspective view of a portion of a disk drive according to an embodiment of the present invention (without a top VCM plate shown for ease of illustration) with the latch in a closed position and a portion of the actuator (in a parked position).

The actuator 26 further includes a coil support element 40, as shown in FIG. 3, that extends from one side of the actuator body 28 opposite the actuator arms 30. The coil support element 40 is configured to support a coil 42. A top VCM plate 44 may be provided as shown in FIGS. 1 and 2. The top VCM plate 44 is not shown in FIGS. 3-10 so as to ease illustration of the other disk drive components. A bottom VCM plate 46 with an attached VCM magnet 48 may also be provided as can be seen in FIGS. 3-10. In the embodiment of FIGS. 1 and 2, the coil 42 is positioned between the VCM magnet 48 and the top VCM plate 44 to form a voice coil motor for controllably rotating the actuator 26. In certain embodiments, the bottom VCM plate 46 may not include a VCM magnet and/or the top VCM plate 44 may include a VCM magnet.

The head stack assembly 24 further includes a flex cable assembly 50 (details of which are not shown for ease of illustration of the actuator 26; for example, a flex cable and pre-amplifier circuitry is not shown) with a cable connector 52. The cable connector 52 is attached to the disk drive base 12 and is disposed in electrical communication with the PCBA. The flex cable assembly 50 supplies current to the coil 42 and carries signals between the heads 34 and the PCBA.

With this configuration, current passing through the coil 42 results in a torque being applied to the actuator 26. A change in direction of the current through the coil 42 results in a change in direction of the torque applied to the actuator 26. It is contemplated that other magnet, VCM plate, coil and magnet support configurations may be utilized, such as a multiple coil arrangement, single or double VCM plates, or a vertical coil arrangement. As will be discussed in detail below, the disk drive 10 includes a latch 54.

Figure 4:
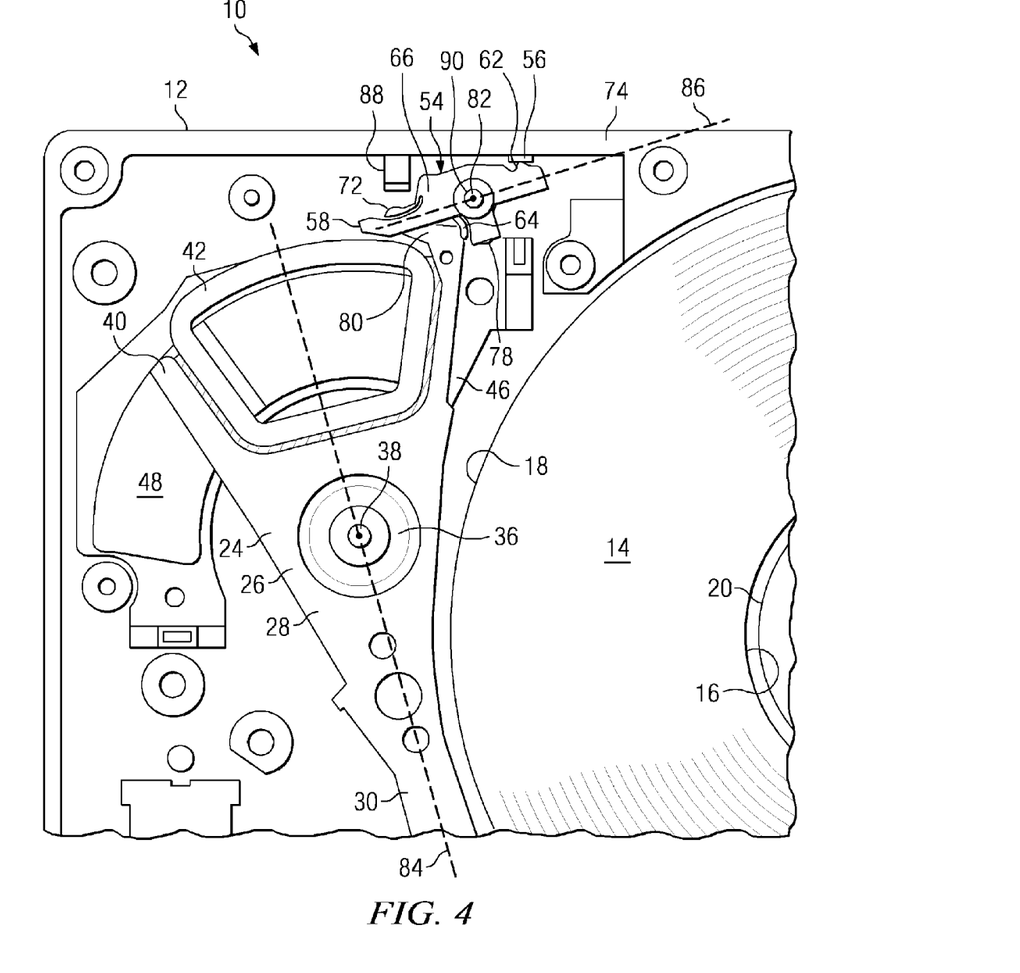
FIG. 4 is a top plan view of the portion of the disk drive of FIG. 3.

FIG. 3 is an enlarged top perspective view of a portion of a disk drive 10 according to an embodiment of the present invention (without the top VCM plate 44 shown for ease of illustration) with the latch 54 (in the closed position) and a portion of the actuator 26 (in the parked position). FIG. 4 is a top plan view of the portion of the disk drive of FIG. 3.

In the embodiment of FIGS. 3-4, the disk drive 10 includes the disk drive base 12. The disk drive 10 further includes first and second fixed members 56 and 88 in fixed spatial relation to the disk drive base 12. The disk drive 10 further includes the actuator 26 rotatably coupled to the disk drive base 12. The actuator 26 includes a catch 80. The disk drive 10 further includes the latch 54 rotatably coupled to the disk drive base 12. The latch 54 includes a catch portion 58 positioned such that, when the latch 54 is in a closed position, the catch portion 58 will interfere with rotation of the actuator 26 via contact with the catch 80 should the actuator 26 rotate sufficiently (e.g. due to a mechanical shock event). The catch portion 58 does not interfere with rotation of the actuator 26 with the latch 54 in an open position. The latch 54 further includes a first stop portion 62 and a pusher portion 64. The first stop portion 62 is in contact with the first fixed member 56 with the latch 54 in the closed position. The first stop portion 62 is not in contact with the first fixed member 56 with the latch 54 in the open position. In the embodiment of FIGS. 3-4, the pusher portion 64 is in contact with the actuator 26 with the latch 54 in the closed position and with the actuator 26 in an extreme clockwise rotational position.

The disk drive 10 may further comprise a latch post 90 extending from the disk drive base 12. The latch post 90 and the disk drive base 12 may be a single component having material continuity as opposed to being an assembly of subcomponents. The latch post 90 may define a latch axis of rotation 82 about which the latch 54 rotates. The latch 54 defines a hole into which the latch post 90 may protrude such that the hole forms a journal bearing interface with the latch post 90. In that case, the latch 54 preferably comprises a lubricated injection molded polymer material that is doped with a lubricant. For example, the latch may comprise a polycarbonate or polyetherimide material doped with polytetrafluoroethylene (PTFE).

As mentioned above, the disk drive 10 includes first and second fixed members 56 and 88 in fixed spatial relation to the disk drive base 12. The first and second fixed members 56 and 88 may be a disk drive base wall 74 of the disk drive base 12 itself. The first and second fixed members 56 and 88 and the disk drive base 12 may together be a single component having material continuity rather than an assembly of subcomponents. This can serve to reduce the number of components and avoid assembly of such components. However, the first and second fixed members 56 and 88 may be separately formed pieces of material that are attached to the disk drive base 12 (e.g. press-fit posts). First and second fixed members 56 and 88 may also be integrally formed with each other (e.g. two surfaces of the same fixed component). All that is required is that first and second fixed members 56 and 88 maintain their position relative to the disk drive base 12.

The first stop portion 62 and the pusher portion 64 may both be a single component having material continuity rather than an assembly of subcomponents, such as in the embodiment shown. This can serve to reduce the number of components and avoid assembly of such components.

In the embodiment shown in FIGS. 1-4, the latch 54 includes a latch arm 66 supporting a catch portion 58. The latch 54 also comprises a second stop portion 72 comprising a cantilevered finger having a supported end and a free distal end, the supported end being attached to the latch 54, the free distal end being in contact with the second fixed member 88 with the latch 54 in the open position. The second stop portion 72 is not in contact with the second fixed member 88 with the latch 54 in the closed position. The pusher portion 64, the second stop portion 72 including the cantilevered finger, and the catch portion 58 may all be a single component having material continuity rather than an assembly of subcomponents. This can serve to reduce the number of components and avoid assembly of such components.

In the embodiment shown in FIGS. 1-4, improved acoustic performance (i.e. quieter latch operation) may be achieved if the cantilevered finger of the second stop portion 58 preferably comprises a polymer material having a elastic modulus in the range 1 GPa to 3 GPa, and preferably defines a finger length in the range 1 mm to 6 mm, a finger cross-sectional height in the range 1 mm to 4 mm, and a finger cross-sectional width in the range 0.3 mm to 1 mm. Also, a more predictable location of contact between the second stop portion 72 and the second fixed member 88 can be achieved, despite manufacturing variations and tolerances, if the distal end of the cantilever finger of the second stop portion 72 is rounded.

The catch portion 58 may be of various shapes and sizes and be configured to engage the actuator 26 at the catch 80 in alternate ways. For example, the catch portion 58 could be configured to receive the catch 80 in the form of a hook. Alternatively, the catch portion 58 could be formed as a hook and the catch 80 could be formed to receive such hook. It is contemplated that the catch 80 may be of other configurations such as a tang or pin. Regardless, it is only required that the catch portion 58 in the closed position be positioned along a path of a portion of the actuator 26 such that contact between the catch portion 58 and such portion of the actuator 26 can occur so as to prevent rotational movement of the actuator 26 in a given direction beyond a desired limit.

As further mentioned above, the catch portion 58 interferes with rotation of the actuator 26 with the latch 54 in a closed position. For example, the catch portion 58 is contacted by the actuator 26, if, during a mechanical shock event, the actuator 26 moves to the position depicted in FIGS. 9 and 10 and the latch 54 is in a closed position. Thus, the catch portion 58 is not always in contact with the actuator 26 when the latch 54 is in a closed position. It is noted that in the embodiment of FIGS. 3 and 4, the catch portion 58 and the catch 80 of the actuator 26 are configured to potentially impact one another upon extreme rotation of the actuator 26.

The latch 54 may be biased to the open position. The latch 54 may further include a latch biasing element 78. The latch biasing element 78 may comprise a ferromagnetic metal material, such as a steel ball bearing (e.g. 400 series stainless steel). The latch biasing element 78 may be magnetically attracted towards the VCM magnet 48. Such magnetic interaction with the latch biasing element 78 results in a biasing force upon the latch 54. Other biasing techniques for the latch 54 may be implemented. For example, a mechanical spring may be attached between the latch 54 and the disk drive base 12, or a dedicated magnet might be used rather than using the VCM magnet. In addition, it is contemplated that the latch 54 could be configured in another embodiment to be biased in a closed position.

Referring now to the embodiments of FIGS. 1-4, as mentioned above, for angular reference purposes each actuator arm 30 may define an actuator arm longitudinal axis 84. Similarly, for angular reference purposes the latch arm 66 is shown to define a latch arm longitudinal axis 86. The actuator 26 is depicted in a parked position. For example, in the embodiment shown, the actuator 26 is considered to be in a parked position as rotated fully in a clockwise direction with the heads 34 positioned radially beyond the outer diameter 18 of each of the disks 14. In such a parked position, the heads 34 are protected from hitting each other and/or hitting the edge of the disk by a load/unload ramp (not shown). Alternatively, the parked position may be a position where each head comes to rest on a textured landing zone of a disk surface (e.g. near the disk inner diameter). In either case, the parked position is the disposition that the actuator 26 is configured to come to rest when not performing read or write operations.

In FIGS. 1-4, the latch 54 is depicted in a closed position and is rotated fully in a counter-clockwise direction. The actuator 26 is disposed in contact with the pusher portion 64. In particular, the backside of the catch 80 is in contact of the pusher portion 64. In alternate embodiments, a separate element of the actuator 26 may come in contact with the pusher portion 64. Because the first stop portion 62 of the latch 54 is disposed in contact with the first fixed member 56, this configuration prevents the actuator 26 from rotating any further in the clockwise direction. In addition, in the embodiment shown, the pusher portion 64 may be rounded so as to come into contact with the actuator 26 in a cam-like rolling interface upon sufficient rotation of the actuator 26 in the clockwise direction (e.g. upon the actuator 26 moving into the parked position).

Figure 5:
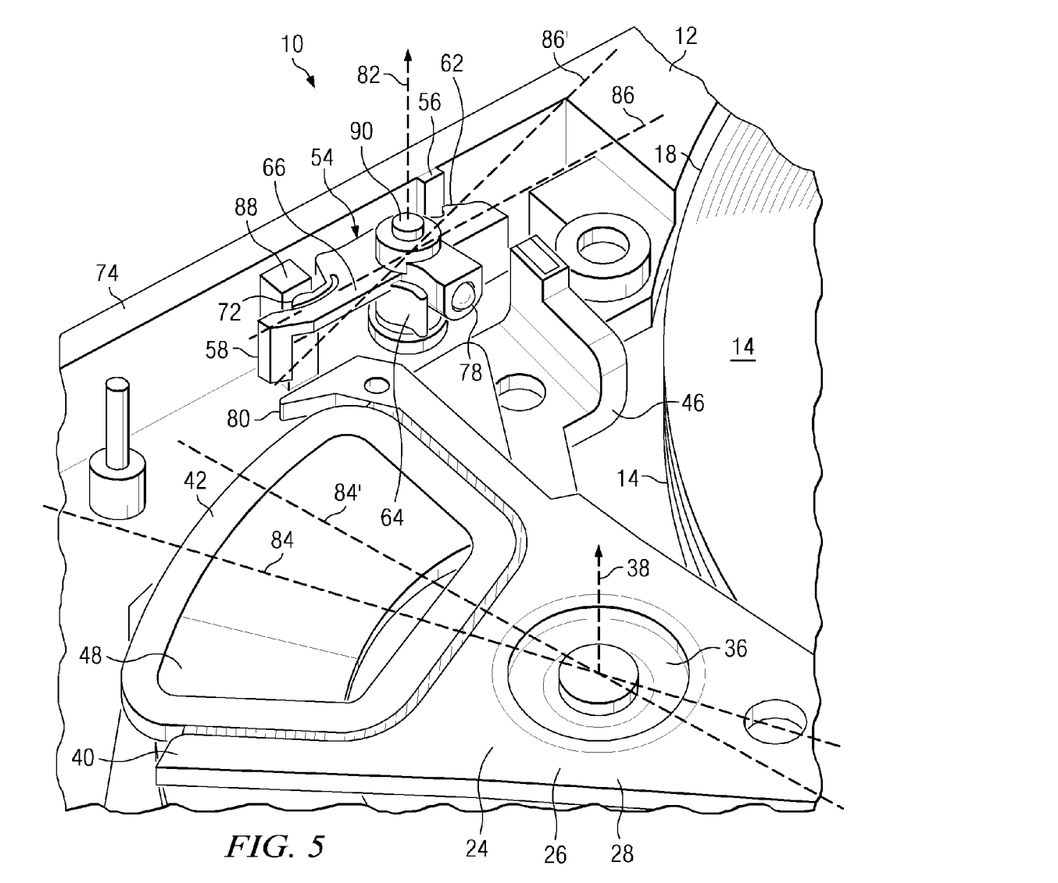
FIG. 5 is an enlarged top perspective view of a portion of a disk drive according to an embodiment of the present invention with the latch in an open position and the actuator in an operable position.
Figure 6:
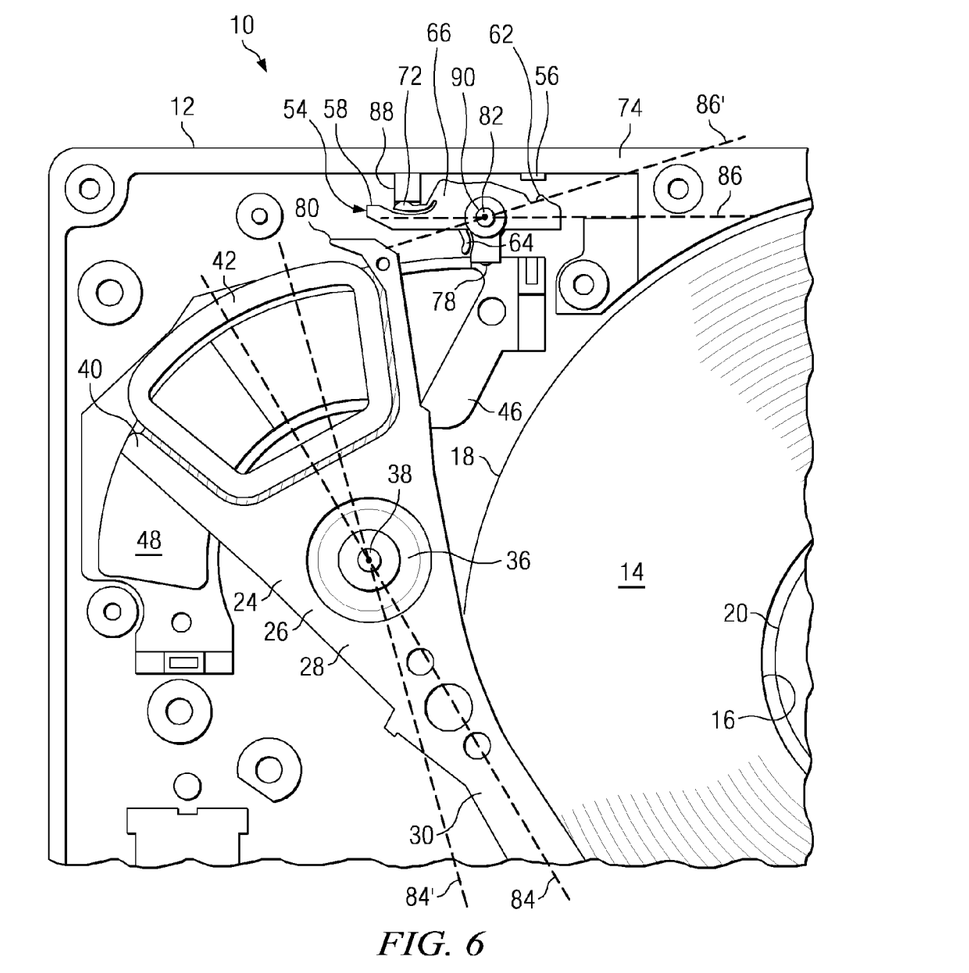
FIG. 6 is a top plan view of the portion of the disk drive of FIG. 5.

Referring now to FIGS. 5 and 6, there is depicted an actuator 26 in an example operable position with the heads 34 positioned somewhere between the inner diameter 16 and the outer diameter 18 of each of the disks 14. The actuator 26 is shown as having been rotated counter-clockwise from the parked position. An actuator arm longitudinal axis 84' is superimposed for reference purposes to indicate the positioning of the actuator arm longitudinal axis 84 as it had been with the actuator 26 in the parked position. It is assumed that the actuator 26 has been rotated by a controlled torque applied by the VCM during normal operation of the actuator 26 in performing read or write operations. As the actuator rotates away from the parked position, the latch 54 also begins to rotate from the closed position in a clockwise direction (e.g. from a rotational position corresponding to a latch longitudinal axis 86' to a rotational position corresponding to latch longitudinal axis 86 as shown). This is because, in the particular embodiment shown, the latch 54 is biased to the open position. As such, by the time the actuator 26 is rotated to approach the position corresponding to longitudinal axis 84, the latch 54 has rotated to the open position with the catch portion 58 at a location where the catch portion 58 is not capable of contacting the catch 80 of the actuator 26 (e.g. a rotational position corresponding to latch longitudinal axis 86 as shown).

Figure 7:
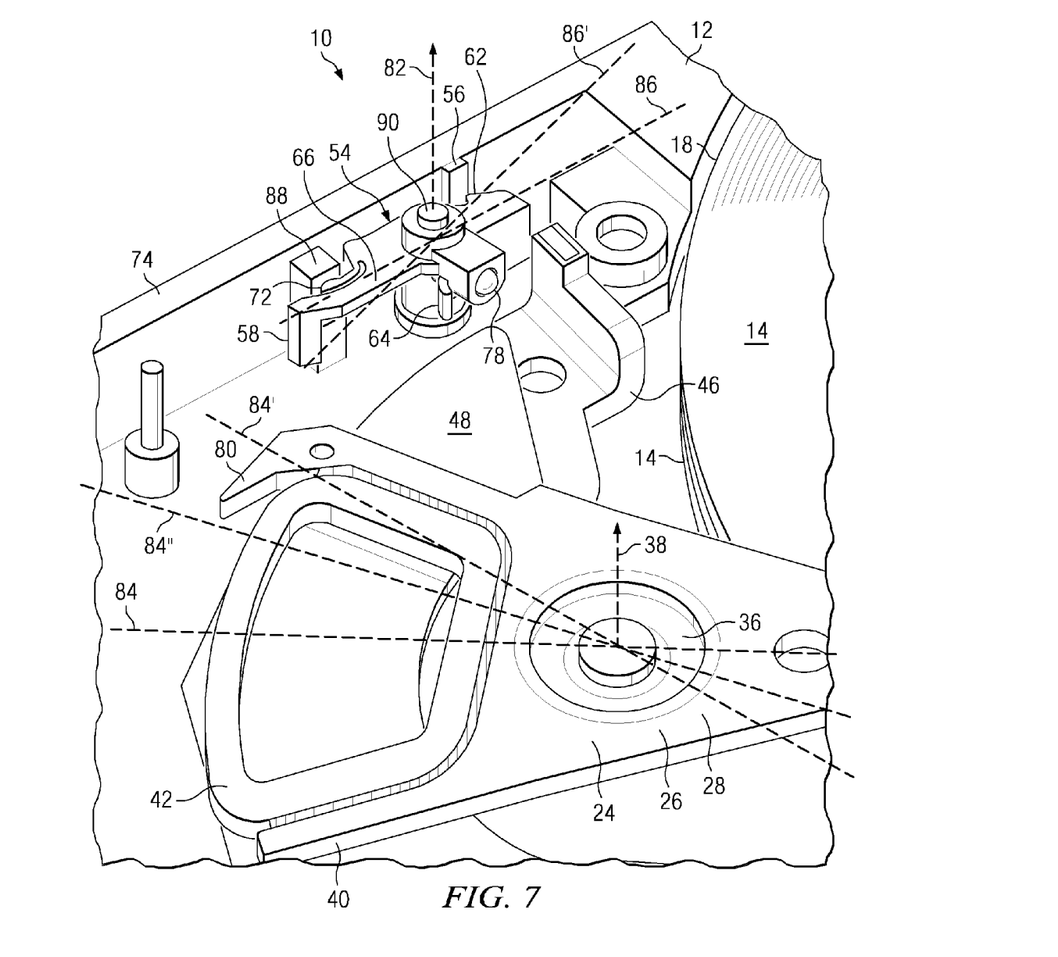
FIG. 7 is an enlarged top perspective view of a portion of a disk drive according to an embodiment of the present invention, with the latch in an open position and the actuator in an extreme angular position (rotated fully counter-clockwise).
Figure 8:
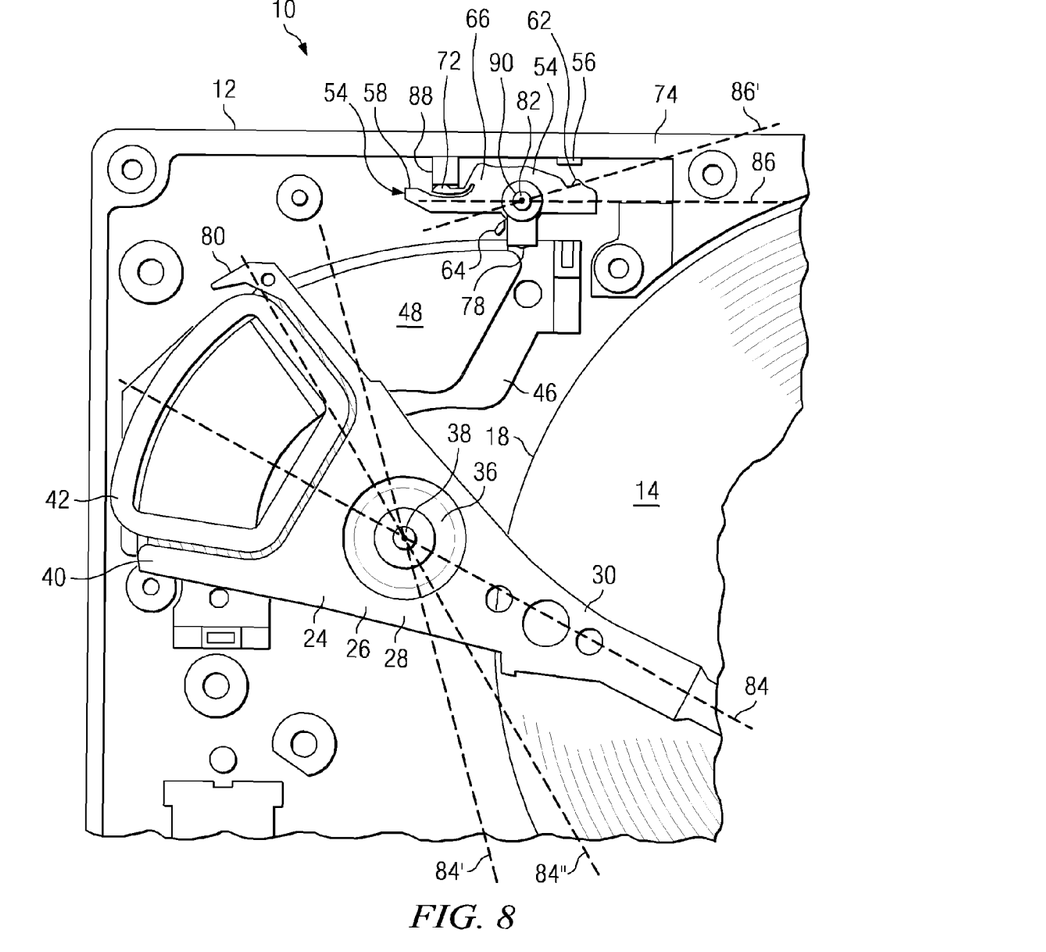
FIG. 8 is a top plan view of the portion of the disk drive of FIG. 7.

Referring now to FIGS. 7 and 8, there is depicted a portion of an actuator 26 having been fully rotated in an extreme counter-clockwise direction (e.g. with the heads 34 adjacent the inner diameter 16). An actuator arm longitudinal axis 84" is superimposed for reference purposes to indicate the positioning of the actuator arm longitudinal axis 84 as it had been with the actuator 26 in the example operational position shown in FIGS. 5 and 6.

Figure 9:
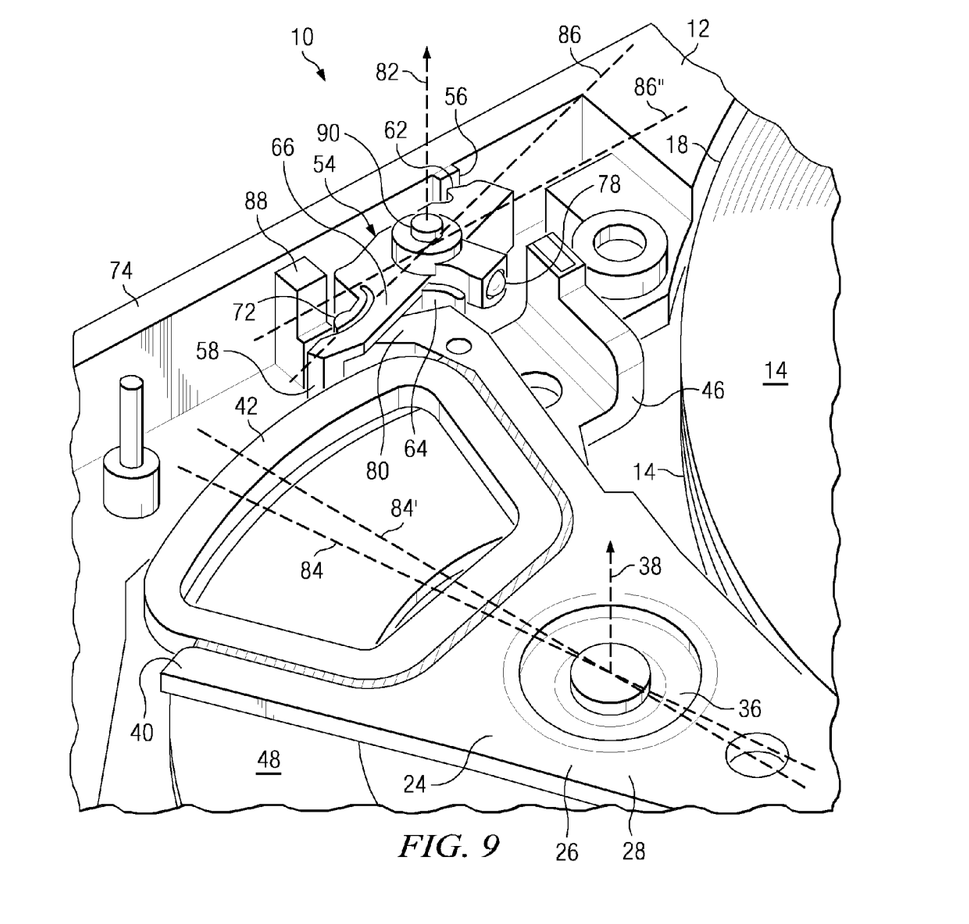
FIG. 9 is an enlarged top perspective view of a portion of a disk drive according to an embodiment of the present invention with the latch in a closed position and the actuator in a latched position.
Figure 10:
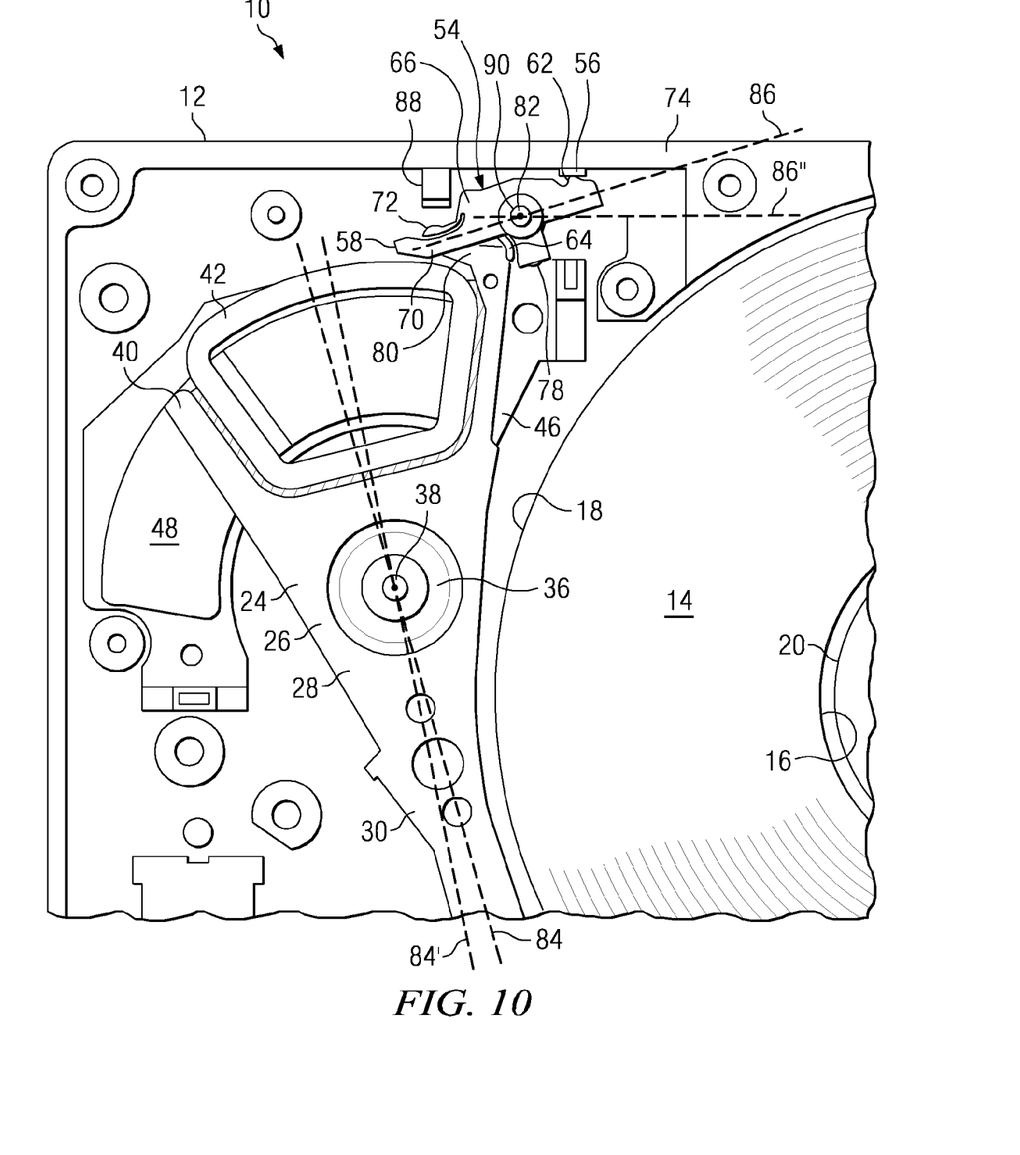
FIG. 10 is a top plan view of the portion of the disk drive of FIG. 9.

It is contemplated that the disk drive 10 may be exposed to external forces, such as a mechanical shock event. Referring now to FIGS. 9 and 10, where the actuator 26 is in a parked position (e.g. corresponding to a parked actuator arm longitudinal axis 84'), such an external force may result in a substantial rotational acceleration having a component about an axis that is parallel to the axis of rotation 38. Where the direction of such rotational acceleration component is such that the disk drive 10 rotates in a clockwise direction, the actuator 26 would tend to relatively rotate in a counter-clockwise direction. Rotation of the actuator 26 in such a direction would result in the heads 34 being undesirably moved over the disks 14 in a rapid uncontrolled manner, possibly resulting in contact between the heads 34 and the disk 14.

However, when the actuator 26 is rapidly rotated from the parked position under such conditions, the actuator 26 becomes latched with the actuator catch 80 in contact with the catch portion 58 of the latch 54 such as shown. This is because the latch 54 is still in the closed position and the biasing force is not strong enough to rotate the latch 54 to the open position quickly enough to avoid interference between the actuator catch 80 and the catch portion 58.

Accordingly, in the embodiment of FIGS. 9 and 10, in response to a rotational shock when the actuator is in the parked position (e.g. corresponding to a parked actuator arm longitudinal axis 84'), the actuator 26 becomes latched before it can rotate counter-clockwise beyond the position indicated by actuator arm longitudinal axis 84.

Figures 11, 12:
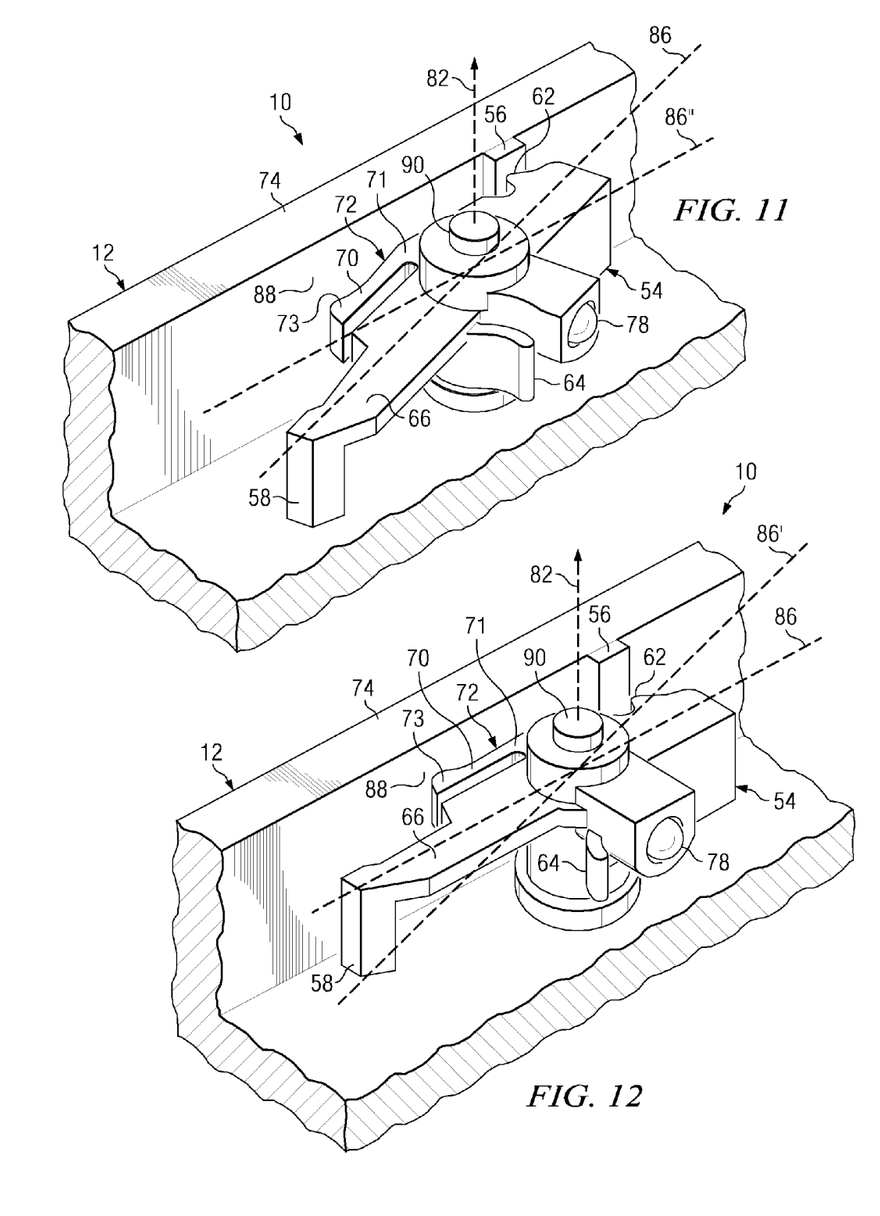
FIG. 11 is an enlarged perspective view of a portion of a disk drive according to an embodiment of the present invention, illustrating the latch in a closed position.
FIG. 12 is an enlarged perspective view of a portion of a disk drive according to an embodiment of the present invention, illustrating the latch in an open position.

FIG. 11 is an enlarged perspective view of a portion of a disk drive according to an embodiment of the present invention, illustrating the latch in a closed position. In the embodiment of FIG. 11, the latch arm longitudinal axis 86 would be aligned with the dashed line 86" if the latch were rotated about latch axis of rotation 82 to be in the open position. FIG. 12 is an enlarged perspective view of a portion of a disk drive according to an embodiment of the present invention, illustrating the latch in an open position. In the embodiment of FIG. 12, the latch arm longitudinal axis 86 would be aligned with the dashed line 86' if the latch were rotated about latch axis of rotation 82 to be in the closed position.

In the embodiment shown in FIGS. 11-12, the latch 54 includes a second stop portion 72 comprising a cantilevered finger 70 having a supported end 71 and a free distal end 73, the supported end 71 being attached to the latch 54, the free distal end 73 being in contact with the second fixed member 88 with the latch 54 in the open position. The second stop portion 72 is not in contact with the second fixed member 88 with the latch 54 in the closed position. In the embodiment of FIGS. 11-12, the second fixed member 88 is merely an inner surface of disk drive base wall 74. The pusher portion 64, the second stop portion 72 including the cantilevered finger 70, and the catch portion 58 may all be a single component having material continuity rather than an assembly of subcomponents. This can serve to reduce the number of components and avoid assembly of such components.

In the embodiment shown in FIGS. 11-12, improved acoustic performance (i.e. quieter latch operation) may be achieved if the cantilevered finger 70 of the second stop portion 58 preferably comprises a polymer material having a elastic modulus in the range 1 GPa to 3 GPa, and preferably defines a finger length in the range 1 mm to 6 mm, a finger cross-sectional height in the range 1 mm to 4 mm, and a finger cross-sectional width in the range 0.3 mm to 1 mm. Also, a more predictable location of contact between the second stop portion 72 and the second fixed member 88 can be achieved, despite manufacturing variations and tolerances, if the distal end 73 of the cantilever finger of the second stop portion 72 is rounded.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. "Comprising," "including," and "having," are intended to be open-ended terms.

What is claimed is:

1. A disk drive comprising:
   a disk drive base;
   a first fixed member in fixed spatial relation to the disk drive base;
   a second fixed member in fixed spatial relation to the disk drive base;
   an actuator rotatably coupled to the disk drive base about an actuator pivot location; and
   a latch rotatably coupled to the disk drive base about a latch pivot location, the latch comprising:
      a catch portion interfering with actuator rotation with the latch in a closed position, the catch portion not interfering with actuator rotation with the latch in an open position;
      a first stop portion in contact with the first fixed member with the latch in the closed position, the first stop portion not being in contact with the first fixed member with the latch in the open position
      a second stop portion comprising a cantilevered finger having a supported end and a free distal end, the supported end being attached to the latch, the free distal end being in contact with the second fixed member with the latch in the open position, the second stop portion not being in contact with the second fixed member with the latch in the closed position; and
      a pusher portion being in contact with the actuator with the latch in the closed position and the actuator in an extreme rotational position, wherein neither the catch portion nor the pusher portion is disposed on the cantilevered finger;
   wherein the pusher portion, the second stop portion including the cantilevered finger, and the catch portion are all a single component having material continuity rather than being an assembly of subcomponents; and
   wherein the cantilevered finger comprises a polymer material having an elastic modulus in the range 1 GPa to 3 GPa and defines a finger length in the range 1 mm to 6 mm, a finger cross-sectional height in the range 1 mm to 4 mm, and a finger cross-sectional width in the range 0.3 mm to 1 mm.

2. The disk drive of claim 1 wherein the latch comprises a material selected from the group consisting of acetal resin plastic, polycarbonate plastic, and liquid crystal polymer.

3. The disk drive of claim 1 wherein a wall of the disk drive base comprises the first fixed member and the second fixed member.

4. The disk drive of claim 1 wherein the latch is biased to the open position.

5. The disk drive of claim 1 wherein the latch further includes a latch biasing element comprising a ferromagnetic metal material.

6. The disk drive of claim 5 wherein the latch biasing element comprises a spherical ferromagnetic metal ball.

7. The disk drive of claim 5 further comprising a voice coil motor magnet disposed adjacent the actuator, the latch biasing element being magnetically attracted towards the voice coil motor magnet.

8. The disk drive of claim 1 wherein the actuator includes a catch, and the catch is in contact with the catch portion with the latch in the closed position.

9. The disk drive of claim 8 wherein the catch is in the shape of a hook.

10. The disk drive of claim 1 wherein the latch further comprises a hole at the latch pivot location, and the disk drive base includes a latch post that protrudes into the hole, and wherein the hole forms a journal bearing interface with the latch post.

11. The disk drive of claim 10 wherein the latch comprises a plastic doped with a lubricant.

12. The disk drive of claim 11 wherein the lubricant is polytetrafluoroethylene (PTFE).

13. The disk drive of claim 1 wherein the free distal end is rounded.

* * * * *